Patented Jan. 10, 1928.

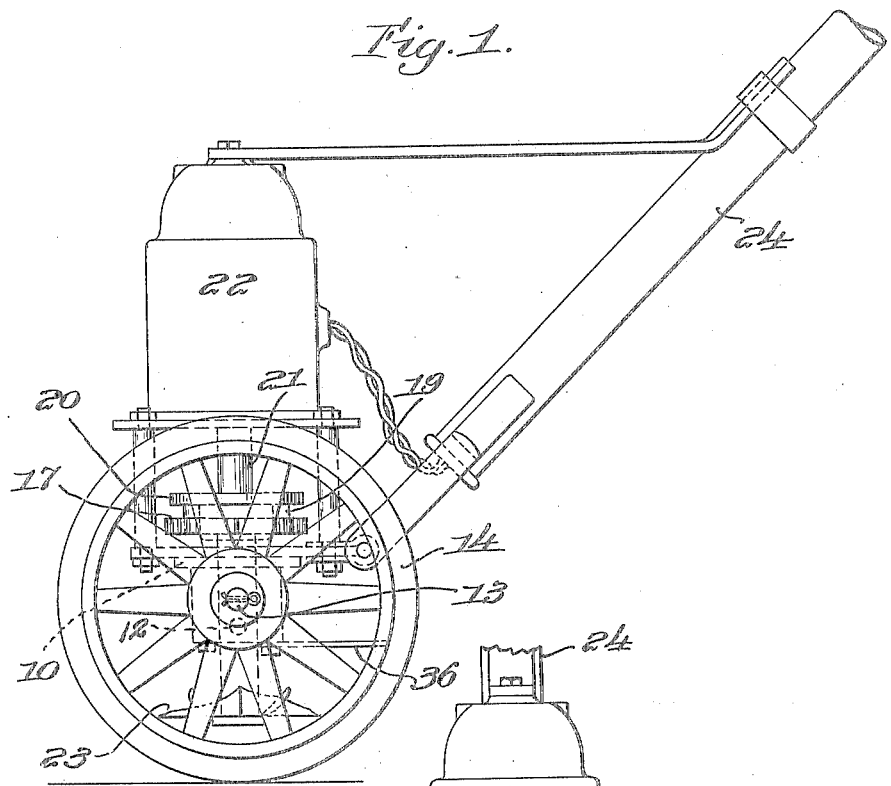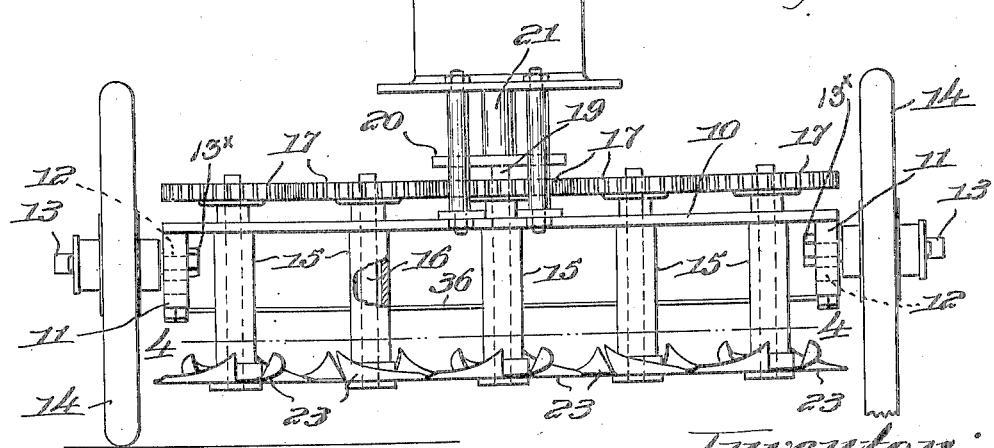

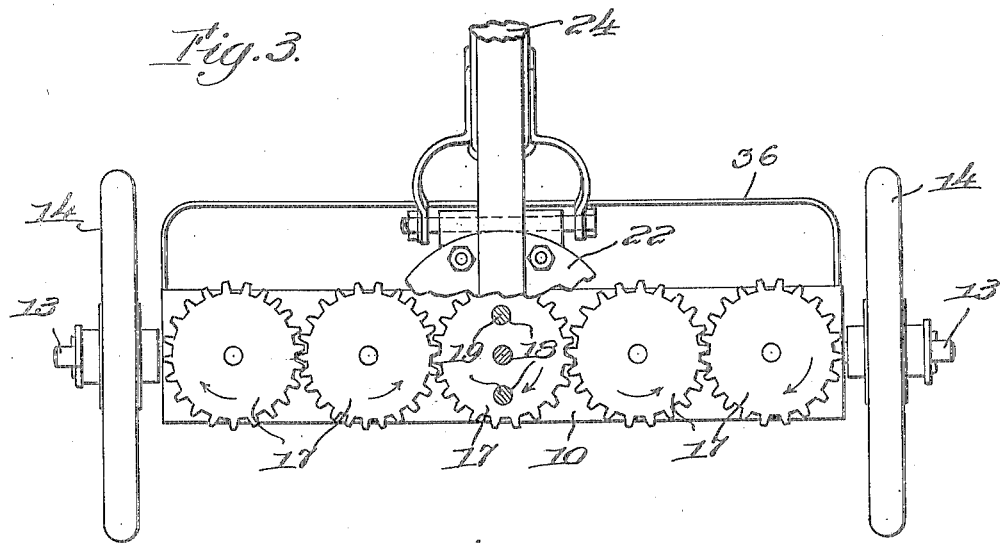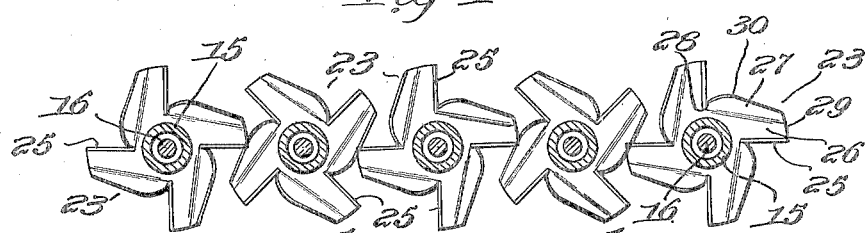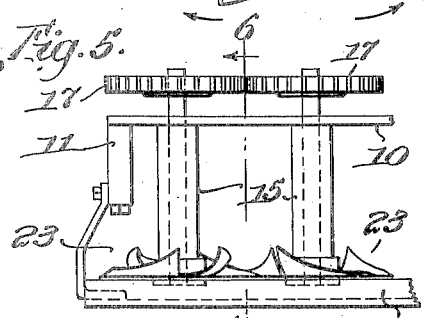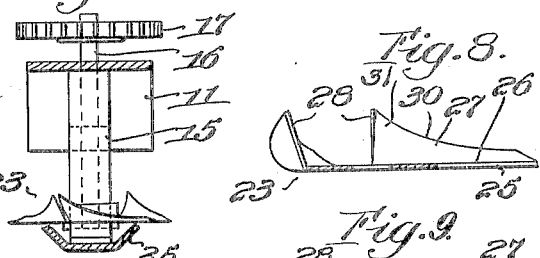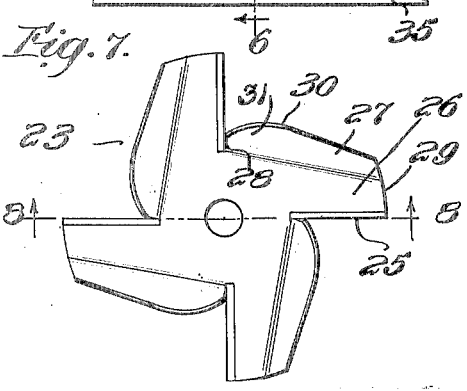

1,656,105

UNITED STATES PATENT OFFICE.

FREDERICK M. DURKEE, OF BROOKLINE, MASSACHUSETTS.

CUTTING MACHINE FOR GRASS AND THE LIKE.

Application filed December 24, 1925. Serial No. 77,428.

This invention relates to machines for cutting grass and the like and more particularly, but not exclusively, to a manually propelled and directed machine having power driven cutting members.

It is an object of the invention to produce a machine of the above class which is light and simple in structure, yet durable, and which may be propelled and directed with such ease that a child can operate it.

It is a further object of the invention to so construct and arrange the cutting members that the grass or growth is actually cut, and not pulled, as is the case in the great majority of grass cutters at present in use which action disturbs the roots and tends to kill the growth.

It is a further object of the invention to produce a grass cutter which operates to cut whether it is propelled forwardly or in the reverse direction, and wherein the cutting members operate independently of a cutting bar or back board or the like, and accomplish a scythe or sickle cut, and not a shearing cut.

Another and a very important object of the invention is to so construct and arrange each or any of the cutting members that the cutting movement thereof creates favorable drafts of air which straighten up limp, weak, or trampled growth that is not upstanding, and positions it for the said members to act upon it.

It is not known that a grass cutting machine has ever been used wherein the operation of the machine generated air currents which caused the growth to be straightened up, and in fact drawn into the paths of rapidly moving cutting edges, nor is it known that a machine has ever been used wherein the cutting members were so constructed as to set up favorable air currents, nor wherein such a cutting member was ever used without the aid of a back board, bar or a similar cutting edge to act in conjunction therewith for the purpose of severing the growth.

From the foregoing it will be understood that it is not the intention to limit the invention to the precise construction and arrangement shown as various changes might be made therein without departing from its spirit and scope.

Other objects of the invention will be fully understood from a description of the drawings and the claims hereinafter given.

Of the drawings:

Figure 1 represents a side elevation of one form of grass cutter in which the invention might be used.

Figure 2 is a view looking toward the right Figure 1.

Figure 3 is a top plan view of Figure 2 partially broken away.

Figure 4 is a section on the line 4—4 Figure 2.

Figure 5 is a detail in front elevation showing a protective guard attached.

Figure 6 is a section on the line 6—6 Figure 5.

Figure 7 is an enlarged top plan view of one of the cutting members detached from the machine.

Figure 8 is a section on the line 8—8 Figure 7.

Figure 9 is an edge view of Figure 7.

Like characters represent like parts throughout the several figures of the drawing.

Referring to the drawings:

The drawings herewith illustrate the invention in one of the many forms in which it might be used, but it will be understood that it is not the intention to limit it to the precise construction and arrangement shown as various changes might be made therein without departing from its spirit and scope.

For convenience of illustration and description the invention has been arranged to be applied to a grass cutting machine and comprises a platform or cutter-supporting frame 10 provided with depending lugs 11 having the holes 12 to receive the studs 13 which serve as axles for the wheels 14, the said holes being vertically arranged so that the platform 10 may be adjusted toward or from the ground the said studs being held in adjusted position by the nuts $13^x$.

The platform 10 has fast therewith and depending therefrom a plurality of sleeves or bearings 15, arranged to receive shafts 16 the upper ends of each of which have fast thereto a gear 17, each in mesh with its neighbor and all being driven from the middle gear which has holes 18 to receive pins 19 projecting from a disk 20 fast on the shaft 21 of a motor 22.

At their lower ends each of the said shafts 16 has fast therewith a cutting member 23 of novel construction, three of which are in this instance arranged and constructed to rotate and cut in one direction or that of the rotation of their shafts, while two rotate and cut in an opposite direction.

This precise arrangement is not essential but it happens to occur in this presentation of the invention.

The motor for driving the cutting members is for convenience shown herein as an electric motor but it will be understood that any suitable driving power might be used, while the guiding handle 24 might be arranged as best suits the conditions or use.

The primary object of the invention is to produce a cutting machine having rapidly moving cutting members and arranged to have movement relatively with respect to the material or growth to be cut, and by air drafts induced by vacuum creating devices carried by the machine cause the said material or growth to be drawn into the most advantageous position for the said cutting members to complete their work.

A simple means for attaining this last mentioned object is to provide a plurality of rotatable cutting members having vacuum creating portions either forming a part thereof or attached thereto, but as the invention contemplates the formation of air drafts to aid in arranging the material or growth for the cutting members to act thereon, it is not the intention to limit the invention to the particular arrangement of cutting member shown, as other means acting in unison with the movements of the cutting member might be employed to accomplish the same purpose.

Viewing Figure 4 it will be seen that the path of the cutting edges 25 of each member 23 overlaps that of its neighbor so that a continuous and uninterrupted swath may be cut whether the machine is travelling in a forward or reverse direction.

As before stated, certain of the cutting members 23 rotate and cut in one direction, while others rotate and cut in the opposite direction, and therefore, they may be said to be made right and left handed, but since the principle involved is the same in each, it is only necessary to explain the construction of one of them to enable the operation of the others to be understood.

The particular cutting member 23 shown herein is stamped out of sheet steel, and is formed so as to present four blade like parts 26 having the radially arranged cutting edges 25 at the front thereof, and a tapered upwardly curved or rolled rear marginal portion 27, terminating in a slightly outwardly inclined edge 28.

The marginal portion 27 preferably starts its taper and upward roll at the periphery 29 of the blade portion 26, gradually increasing in height and abruptness of wall up to approximately the point 30 where the roll is directed inwardly to form the highest and most abrupt portion or wall 31 of the said marginal portion which terminates in a substantially vertical edge 28.

When the cutting member 23 is rotated, a column of air will be lifted by the upturned marginal edge 27, its volume increasing and its rapidity of upward movement becoming accelerated as the inner terminal of the marginal portion is approached, at which point the air column is given a final impetus by the inwardly rolled portion 31 which directs it inwardly and upwardly in a substantially vertical column of considerable density to surround the bearing 15, and thus provide a barrier which cut grass or material cannot penetrate to become wound about the said bearing 15.

It will be evident that the column of air lifted by the top face portions of the upwardly and inwardly rolled marginal edges will create a vacuum at the bottom face which will be filled by an upward rush of air directly behind the said edges and immediately in front of the cutting edges 25, which will cause limp and trampled grass or drooping material to become straightened and drawn into the path of the said cutting edges.

In practice a guard 35 will be arranged below the cutting members 23 to prevent the said cutters or the hubs thereof from contact with lumpy spots when the machine is to be used mowing lawns, and while the said guard has its front and rear edges located quite close to the path of the cutting edges of the members 23, they do not cooperate therewith to aid in the cutting operation as the said members do not require such aid.

At the rear the machine is provided with a guard 36 to protect the feet of the operator from injury by contact with the machine or the cutting members thereof.

The present invention is an improvement on an application filed by me August 6, 1925, Ser. No. 48,626, in which application the cutting members are flat, and no attempt has been made to so construct them that they would create air drafts as in the present application.

Having described the invention I claim:

1. In a machine of the class described, a cutter supporting frame; a plurality of rotating cutting members mounted on said frame; means to actuate said members, and rotating fan blades carried by said frame and serving to create air drafts whereby the material to be cut is straightened and drawn into the paths of said cutting members to be cut thereby.

2. In a machine of the class described, a cutter supporting frame; means to provide for adjustment of said frame relatively to the material to be cut; a plurality of cutting members mounted on said frame; a motor mounted on said frame for driving said cutting members, and fan blades forming part of said members for creating air drafts whereby the material to be cut is straightened and drawn into the path of said members to be cut thereby.

3. In a machine of the class described, a cutter supporting frame; a plurality of cutting members mounted on said frame; means to actuate said members, said cutting members having vacuum creating devices carried thereby, whereby the material to be cut is straightened and drawn into the paths of said cutting members to be cut thereby.

4. In a machine of the class described, a cutter supporting frame; a plurality of rotatable cutting members mounted on said frame, each of said members comprising a plurality of cutting blades each of which has an upwardly turned portion at the rear thereof which increases in width and consequently height from the free ends thereof inwardly; means to rotate said cutting members; and a guard interposed between the said cutting members and the material to be cut.

5. In a machine of the class described, a cutter supporting frame; a plurality of rotatable members mounted on said frame, each comprising a plurality of combined cutting and fan blades and each of said blades having an upwardly turned fan blade at its rear which increases in width and consequently height from the free end thereof inwardly; means to rotate said members, and a guard between said members and the material to be cut.

Signed by me at Boston, Massachusetts, this 19th day of December, 1925.

FREDERICK M. DURKEE.